(No Model.)

B. MARKS.
NUT AND BOLT LOCK.

No. 255,802. Patented Apr. 4, 1882.

Witnesses:

Inventor:
Bernhard Marks
By his Attys,

UNITED STATES PATENT OFFICE.

BERNHARD MARKS, OF FRESNO, CALIFORNIA, ASSIGNOR, BY DIRECT AND MESNE ASSIGNMENTS, TO ALPHONSO B. SMITH, OF NEW YORK, N. Y.

NUT AND BOLT LOCK.

SPECIFICATION forming part of Letters Patent No. 255,802, dated April 4, 1882.

Application filed July 23, 1881. (No model.)

*To all whom it may concern:*

Be it known that I, BERNHARD MARKS, of Fresno, in the county of Fresno and State of California, have invented certain new and useful Improvements in Bolts and Nuts; and I do hereby declare that the following is a full, clear, and exact description thereof, reference being had to the accompanying drawings.

My invention relates to that class of bolts and nuts in which the binding-nut is locked and prevented from being jarred loose by turning a jam-nut up against it on a reverse screw-thread.

The invention consists in combining a double screw-threaded bolt with a pair of double screw-threaded nuts, capable of being placed either way upon the bolt, as hereinafter more fully set forth.

Figure 1:
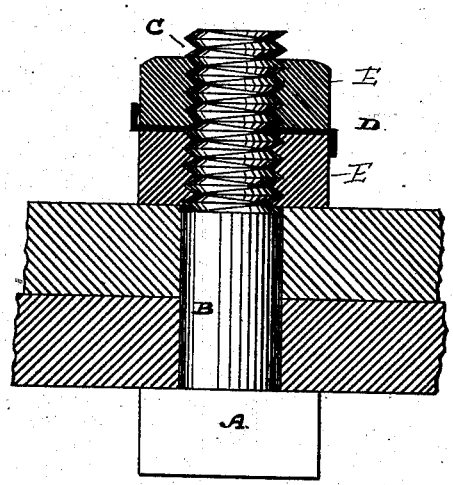
Figure 2:
Figure 3:

Referring to the accompanying drawings, Figure 1 shows my improved bolt with lock-nut and washer as applied to unite two plates or other parts of a structure together. Fig. 2 is a side view of the bolt shown in Fig. 1. Fig. 3 is a section of the double-threaded nut.

Let A represent the head, and B the shank, of a bolt. The screw end of this bolt I cut with two threads, one of which is a right-hand thread and the other a left-hand thread. Both of these threads extend the entire length of the threaded portion C, and they intersect and cross each other, so that two perfect threads are formed, on each of which a nut can be turned.

I make the nuts E E with a double screw-thread in each one, and by starting them upon either the right or left hand screw-thread on the bolt C the nuts can be put on and screwed down. The nuts thus threaded are screwed on, one in one way and the other in the other. Thus the first or lower nut is screwed on the left screw-thread, and the upper nut will then be screwed on the right screw-thread; or, if desired or it is most convenient, the succession may be reversed and the first or lower nut screwed on the right screw-thread. In this way I get all the advantages of alternate left or right internally-threaded nuts, and gain the further advantage of having it possible to put either nut on in either direction without stopping to pick and assort the nuts. To more thoroughly insure a secure hold of the nuts and prevent the possibility of their turning, I place a washer, D, of some metal capable of being bent, between the nuts, and after screwing them up close together I bend the edges of the washer over each of the nuts, and thus secure them.

Having thus described my invention, I claim—

The combination, with a double screw-threaded bolt, of a pair of double screw-threaded nuts capable of being placed either way upon the bolt, substantially as set forth.

In witness whereof I have hereunto set my hand and seal.

BERNHARD MARKS. [L. S.]

Attest:
J. N. PRATHER,
JNO. L. BOONE.